UNITED STATES PATENT OFFICE.

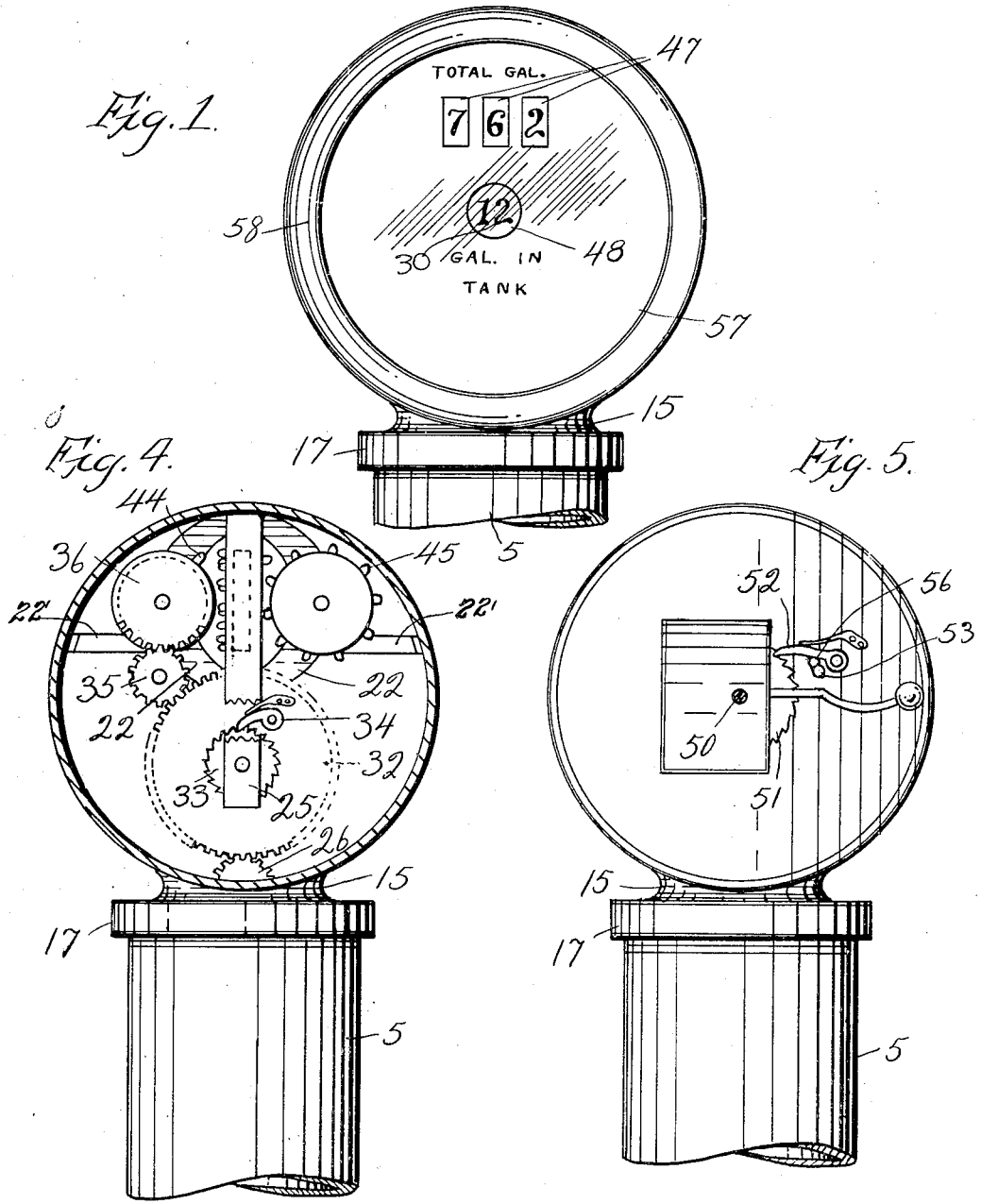

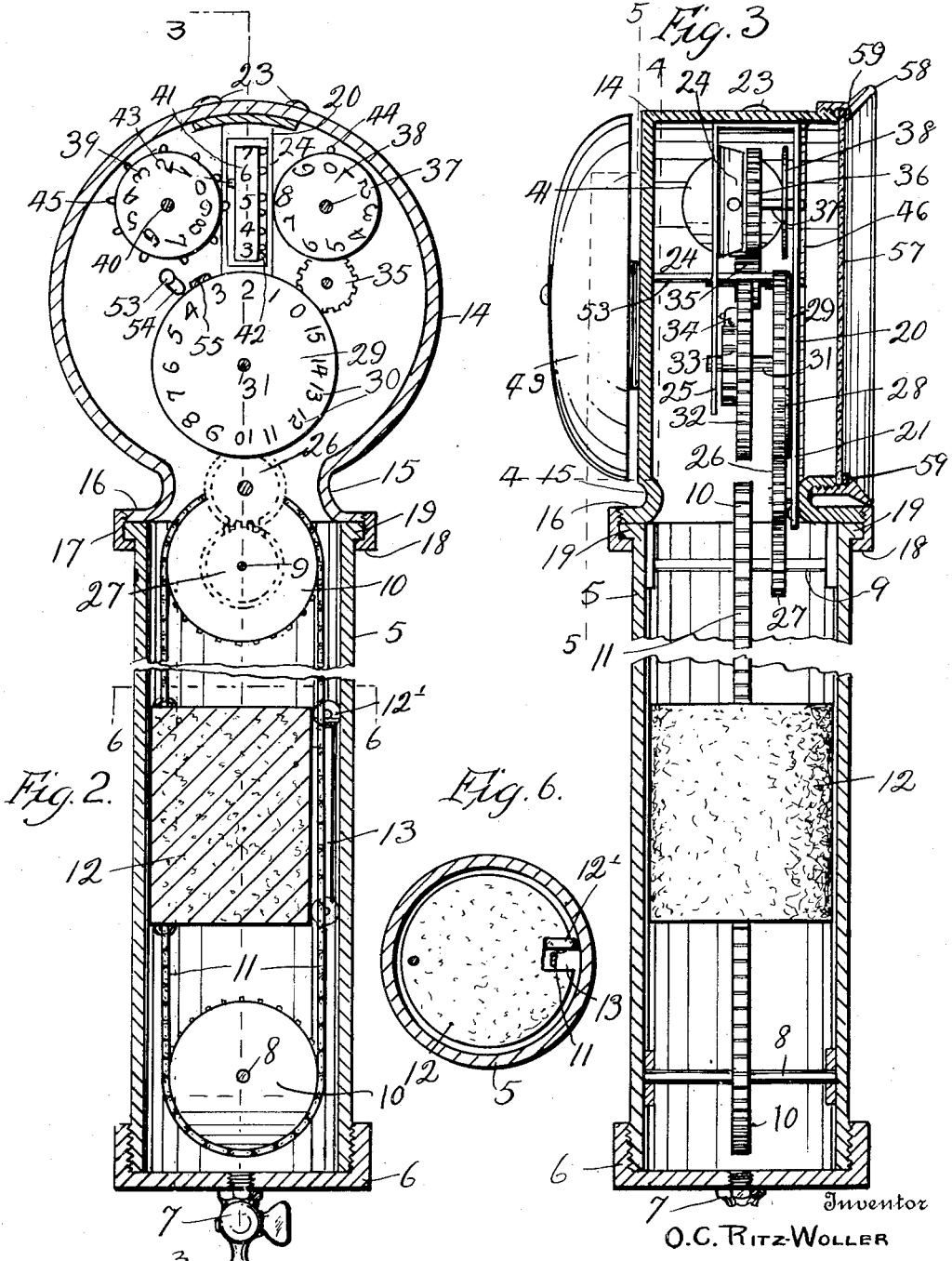

OLIVER C. RITZ-WOLLER, OF JACKSONVILLE, FLORIDA.

FLUID-GAGE.

1,102,168.  Specification of Letters Patent.  Patented June 30, 1914.

Application filed February 27, 1913. Serial No. 751,133.

*To all whom it may concern:*

Be it known that I, OLIVER C. RITZ-WOLLER, a citizen of the United States, residing at Jacksonville, in the county of Duval and State of Florida, have invented certain new and useful Improvements in Fluid-Gages, of which the following is a specification, reference being had to the accompanying drawings.

This invention relates to an improved fluid gage, and more particularly to a gage for gasolene tanks such as are commonly provided upon automobiles and similar motor driven vehicles.

The invention has for its primary object the provision of comparatively simple and highly efficient mechanism, whereby the amount of gasolene remaining in the tank may be accurately ascertained and also the total amount of gasolene which has been consumed without requiring that the driver or operator shall leave his seat.

Another object of the invention resides in the provision of improved means for mounting the indicating mechanism upon the gage tube, whereby the various elements may be very compactly arranged so that the device can be mounted upon the dashboard of the vehicle and will occupy but little space.

Still another object of the invention is to provide an alarm device automatically actuated when the fluid in the storage tank reaches a predetermined depth.

A still further object of the invention is to provide a gage for gasolene tanks having the above noted novel structural features which may be produced at small manufacturing cost and which is highly reliable in actual use.

With the above and other objects in view, this invention consists in the novel features of construction, combination, and arrangement of parts as will be hereinafter referred to and more particularly pointed out in the specification and claims.

In the accompanying drawings forming a part of this application, Figure 1 is a front elevation of a gage embodying the present invention. Fig. 2 is an enlarged vertical section thereof. Fig. 3 is a section taken on the line 3—3, of Fig. 2. Fig. 4 is a section taken on the line 4—4, of Fig. 3. Fig. 5 is a section taken on the line 5—5, of Fig. 3. Fig. 6 is a horizontal section taken on the line 6—6, of Fig. 2.

Referring in detail to the drawings, 5 designates a metal tube which may be of any desired length and diameter in accordance with the capacity of the gasolene storage tank. The lower end of this tube is closed by means of a cap 6 which is threaded thereon. Any approved means of securing a fluid tight connection between this cap and the tube may be provided. The cap 6 carries a suitable drain cock 7. The ends of a shaft 8 are journaled in suitable bearings provided upon the inner wall of the tube 5 at diametrically opposite points and at the upper end of this tube a similar shaft 9 is arranged. Upon each of these shafts a sprocket wheel 10 is fixed. The sprocket wheels are traversed by a link chain 11 of any suitable construction. The ends of this chain are suitably fixed to the upper and lower ends of a cylindrical float body 12 at one side of its center, and said float is provided in its periphery, diametrically opposite the fixed ends of the chain, with a longitudinal groove 13, in which said chain is loosely disposed. Upon the upper and lower ends of the float body 12, a roller 12' is mounted to engage the wall of the tube or cylinder 5, and thus hold the float out of contact with said wall.

14 indicates a casing which is of general cylindrical form and is provided within a neck or extension 15, which is flanged, as indicated at 16. This flange, upon its periphery, is provided with screw threads for engagement by the interior threads of a coupling ring 17. This ring is formed with an annular shoulder 18 for engagement under an annular flange 19 provided upon the upper end of the gage tube 5. Within the casing 14 a skeleton frame, indicated at 20, is arranged. This frame is preferably constructed from sheet metal and embodies in its construction a centrally located body 21, from one end of which the curved or bowed arms 22 branch in opposite directions. The ends of these arms are integrally connected and secured, as indicated at 23, to the top of the cylindrical casing 14. Brackets 22' also connect the arms 22 to opposite sides of the casing and serve as additional means of support for the skeleton frame. The frame 20 upon the connected ends of the arms 22 is provided with spaced parallel bearing portions 24, which extend downwardly and terminate in the extension 25, which is disposed in parallel relation to the body portion of the frame.

It will be noted from reference to Fig. 2 that the body of the frame 20 extends downwardly through the reduced neck 15 of the casing and has a pinion 26 suitably mounted upon its lower end. This pinion is engaged by the teeth of the gear 27 fixed upon the upper sprocket shaft 9 and in turn engages the teeth of an enlarged gear wheel 28 mounted upon the body of the frame 20. This gear wheel carries a dial plate 29, upon one face of which numerals, indicated at 30, are printed or otherwise delineated. Upon the shaft 31 of the gear 28, a second gear wheel 32 is loosely mounted. One end of the shaft 31 is journaled in the body portion of the frame 20 while the other end thereof is journaled in the frame extension 25. Upon this shaft adjacent to the gear wheel 32, a ratchet disk 33 is fixed, and with the teeth thereof one end of the spring pawl 34 mounted upon the loose gear wheel 32 engages. The numerals provided upon the dial plate 29 indicate the depth of gasolene remaining in the storage tank, either in gallons or in inches, as may be preferred.

A gear wheel 32 meshes with a pinion 35 fixed upon the short shaft which is journaled in the extension 25, and one of the arms 22 of the frame 20. This pinion in turn transmits rotation to a gear wheel 36 fixed upon a shaft 37 journaled in the frame arm 22. A numeral carrying dial plate 38 is also fixed upon said shaft, and a similar dial plate 39 is mounted upon the shaft 40 which is journaled in the other of the frame arms 22. Between the spaced bearing portions 24 of the frame 20, a numeral carrying wheel 41 is arranged, said wheel being provided with stub shafts journaled in said bearings. The numeral wheels 38, 39 and 41 carry the numerals from 0 to 9, said numerals being provided upon one face of the numeral wheels 38 and 39, while the same are provided upon the periphery of the wheel 41. From one face of the centrally located wheel 41, adjacent to its periphery, the spaced pins 42 project, said pins corresponding in number to the number of numerals on the wheel. From the opposite face of said wheel, a single pin 43 projects. The numeral wheel 38 is provided upon its periphery with a lug 44 for engagement with the pins 42, while the other numeral wheel 39 is provided with a pin 45 upon its periphery for each of the numerals appearing thereon, said latter pins being engaged by the lug or pin 43 upon the wheel 41. It will thus be obvious that rotation is properly transmitted from the units wheel 38 to the tens wheel 41 and from said latter wheel to the hundreds wheel 39. To the skeleton frame 20 a metal plate 46 is secured, and this plate is provided with an opening 47 through which the numerals appearing upon the wheels 38, 39 and 41 may be viewed, and also with a second opening 48 through which the numerals on the dial plate 29 may be observed.

From the above, it will be seen that as the gasolene in the storage tank is consumed, the float 12 will descend in the tube 5, and thereby rotate the shaft 9 to transmit rotation to the dial carrying gear 28 through the medium of the pinion 35. The several gear elements are of course in proper ratio so that the numeral carrying wheels will be moved at the proper speed to successively dispose the numerals carried thereby opposite the sight opening 47 in the plate 46, in accordance with the consumption of the gasolene. The gasolene in the gage tube will be agitated so that its level will fluctuate, thus causing the float to rise and fall. By loosely mounting the gear 32 upon the shaft 31, the same will remain stationary in the reverse rotation of said shaft and the ratchet 33 which is fixed thereon so that the total consumption indicating wheels will not be reversed.

In addition to the foregoing, I have provided an alarm device which is automatically actuated when the level of gasolene in the storage tank reaches a predetermined point. This alarm device is in the form of a bell 49 mounted upon one side of the casing 14. This bell is of the ordinary construction, the hammer thereof being actuated by means of a coil spring mounted upon the shaft 50. This shaft 50 carries a ratchet wheel 51 which is engaged by a spring held pawl 52. A rod 53 is mounted in the casing 14 and in the frame 20, and is provided upon one end with an arm 54 disposed in the path of movement of a lug 55 secured to the gear 28 adjacent its periphery. The other end of this rod 53 is provided with a detent 56 disposed beneath the pawl 52. It will thus be apparent that when the lug 55 strikes the arm 54, the shaft or rod 53 will be rocked, and the detent 56 will lift the pawl 52 out of engagement with the teeth of the ratchet 51, thus permitting of the unwinding of the coil spring for the actuation of the hammer shaft of the bell. The lug 55 is so located upon the gear 28 that the spring of the pawl will be released when the numeral "2" on the face of the dial plate 29 appears in the opening 48 of the plate 46. The shaft or rod 53 extends through a suitable packing box upon the wall of the casing 14.

The side of the casing 14 adjacent to the plate 46 is open, and over the same a glass or other transparent disk 57 is disposed, said glass disk being held in place by means of a ring or annulus 58, threaded upon the annular wall of the casing. Between this ring and the face of the glass disk 57 a packing strip 59 is arranged to provide an air tight closure.

From the foregoing, it is believed that the construction and manner of operation of my improved automatic gage will be clearly understood.

The device is comparatively simple in its construction and may be successfully employed upon all fluid storage tanks.

It is, of course, understood that while I have referred to my invention as particularly applicable to automobiles or other motor driven vehicles, the same may also be applied to boilers and the like.

The invention is also susceptible of a great many minor modifications in the form, arrangement and construction of the several parts, without necessitating any departure from the principle thereof, as defined in the appended claims or sacrificing any of its advantages.

What is claimed is:—

1. A gage of the character described comprising a tube, a casing mounted upon the upper end of said tube, a frame arranged within said casing and secured to the top wall thereof, said frame embodying spaced depending arms, depth indicating means mounted between said arms, total consumption indicating means mounted between the arms, gearing connecting the total consumption and depth indicating means for coöperation and also mounted in the frame arms, said indicating means and gearing being removable with the frame from the casing, a shaft mounted in the tube and geared to the depth indicating means, a float arranged in said tube, and a flexible connection between said float and the shaft whereby said shaft is rotated.

2. A gage of the character described comprising a tube, a casing mounted upon the upper end of said tube, open upon one side, a frame secured within the casing, a numeral carrying depth indicating wheel mounted within the frame, total consumption indicating wheels mounted in said frame, a plate secured to the frame between the same and the open side of the casing, said plate being provided with sight openings through which the numerals on the several wheels may be viewed, a transparent disk secured upon the open side of the casing, gearing connecting the depth and total consumption indicating means to operate the same in unison, a float arranged in the tube, a shaft mounted in said tube and geared to the depth indicating wheel, a sprocket wheel upon said shaft, and a chain connected to the float and traversing said sprocket wheel.

In testimony whereof I hereunto affix my signature in the presence of two witnesses.

OLIVER C. RITZ-WOLLER.

Witnesses:
M. C. LYDDANE,
E. G. WHITE.